Figure 1:
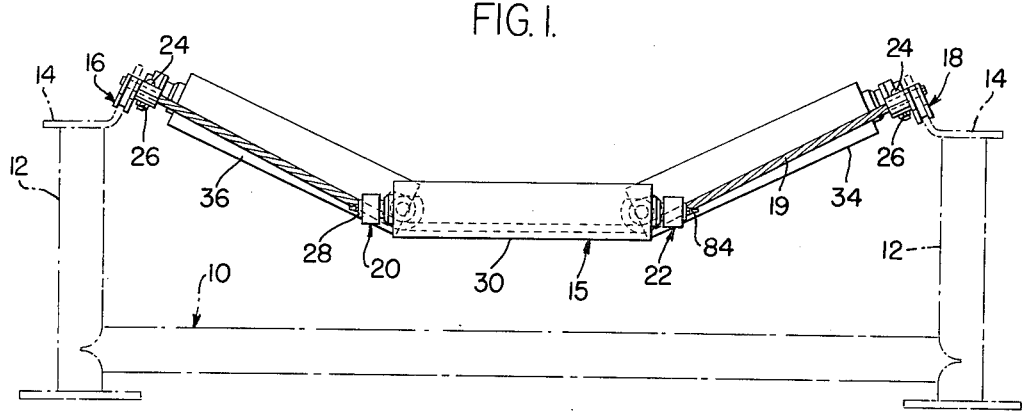

Aug. 10, 1965   W. HANSON, JR., ETAL   3,199,660
CONVEYOR DEVICE
Filed May 15, 1961   2 Sheets-Sheet 1

INVENTORS:
WILLIAM HANSON, JR.
GLENN E. GRAY
BY
*E. Wallace Breitsch*
ATTORNEY

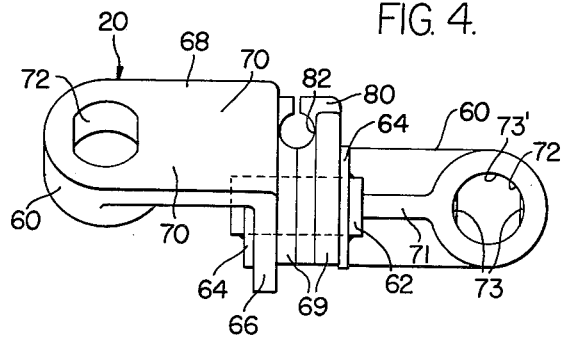
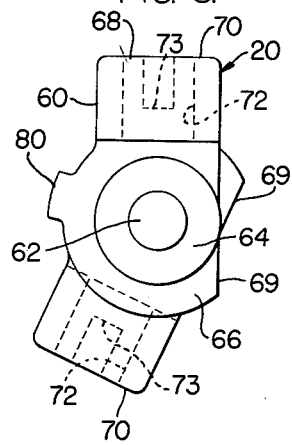
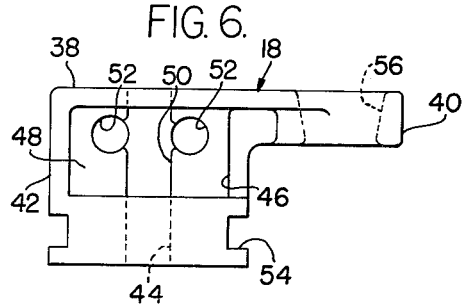
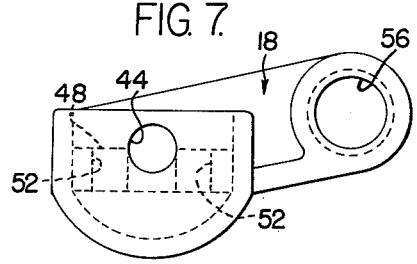
INVENTORS:
WILLIAM HANSON, JR.
GLENN E. GRAY
BY
*E. Wallace Breisch*
ATTORNEY

United States Patent Office 3,199,660
Patented Aug. 10, 1965

3,199,660
CONVEYOR DEVICE
William Hanson, Jr., Dover, and Glenn E. Gray, Tippecanoe, Ohio, assignors to Joy Manufacturing Company, Pittsburgh, Pa., a corporation of Pennsylvania
Filed May 15, 1961, Ser. No. 110,106
11 Claims. (Cl. 198—192)

This invention relates to a conveyor device and more particularly to a roatable troughing idler assembly of the suspension type for supporting a flexible conveyor belt thereon.

Three roll suspension troughing idlers are well known in the art. Such an idler conventionally comprises three elongated rigid cylindrical belt supporting and contacting rollers rotatably and flexibly supported upon a flexible member disposed in a troughing profile between a pair of inwardly tilted laterally spaced conveyor supports. In some idlers of the prior art the flexible member is subjected to continual flexing with attendant early fatigue and failure. In other idlers of the prior art the flexible element is subject to highly localized sharp bends between the individual roller members causing over-stressing of some portions of the flexible member. Since the roller axes of this type of idler are aligned within a vertical plane these rollers must be longitudinally spaced, leaving a portion of the conveyor belt unsupported. Another disadvantage of idlers of the prior art is the difficulty and inconvenience encountered in applying lubrication to bearings within the rollers because of the above cited alignment and necessarily small longitudinal spaces between the rollers.

The present invention discloses an improved idler roller assembly having three cylindrical rollers supported in a troughing relationship by a flexible member, the flexible member being, however, external of the rollers and subjected to bends of a preselected comparatively large radius determined by the radius of an arcuate groove in clamping brackets supported by the flexible member. The adjacent rollers being laterally spaced from each other are longitudinally overlapping, so that no portion of the overlying conveyor belt is left unsupported. The arrangement of the idlers of the present invention is such that lubrication of the bearings therein is relatively easy.

It is therefor an object of this invention to provide a new and improved conveyor device comprising a suspension troughing idler assembly having three rollers supported by a flexible member.

It is a further object of this invention to provide a new and improved conveyor device comprising a suspension troughing idler assembly having three rollers supported by a flexible member externally disposed to the rollers.

It is another specific object of this invention to provide a new and improved conveyor device comprising a troughing idler assembly having three rollers supported by a flexible member, adjacent rollers being in longitudinal overlapping relationship to provide continuous support for an overlying conveyor belt.

It is a more specific object of this invention to provide a new and improved conveyor device comprising a troughing idler assembly having three rollers supported by a flexible member external thereto which flexible member is subjected to bends of a controlled predetermined radius by clamping brackets.

It is another specific object of this invention to provide a new and improved conveyor device comprising a troughing idler assembly having three rollers supported by a flexible member cooperable to form an adjustable support to provide variable troughing for an overlying conveyor belt.

It is another specific object of this invention to provide a new and improved conveyor device comprising a troughing idler assembly having three rollers supported by a flexible member external thereto, the ends of such rollers being readily accessible for the purpose of lubrication.

It is a further specific object of this invention to provide a new and improved conveyor device comprising a troughing idler assembly having three rollers supported by a flexible member cooperable with the roller members and supporting brackets to form a light weight, adjustable, support for an overlying conveyor belt.

Figure 2:
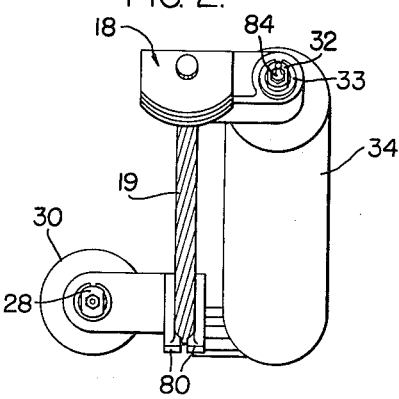
Figure 3:
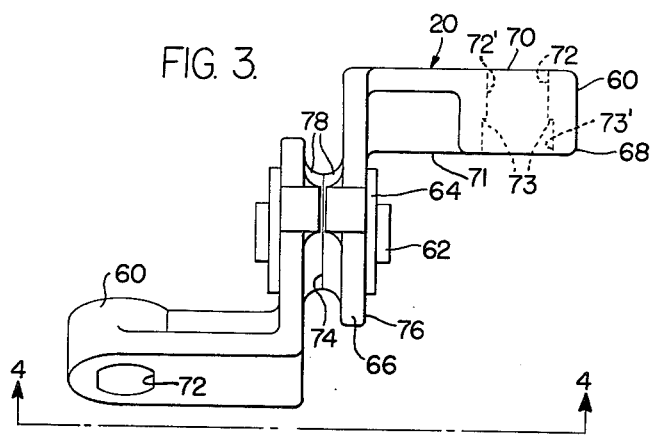

These and other objects of this invention will become hereinafter more fully apparent from the following description taken in conjunction with the annexed drawings which illustrate a preferred embodiment of this invention and wherein:

FIG. 1 is a front elevational view of a conveyor device constructed according to the principles of this invention together with a phantom view in dotted outline of a suitable support therefor, FIG. 2 is an end elevational view of the device shown in FIG. 1, FIG. 3 is a bottom plan view rotated 90° in a counterclockwise direction, of a support bracket supporting the left end of the intermediate roller and the right end of the left end roller in FIG. 1, FIG. 4 is a view of the bracket of FIG. 3, taken from the line 4—4, looking in the direction indicated by the arrows, FIG. 5 is a side elevational view of the bracket shown in FIG. 3, FIG. 6 is a top plan view of the right end support bracket shown obliquely in FIG. 2, FIG. 7 is a front elevational view of the end support bracket shown in FIG. 6.

In FIG. 1 there is shown a suitable U-shaped supporting structure 10 having upwardly extending laterally spaced arms 12 on the upper surfaces of which are rigidly secured, flexible brackets 14, respectively, of a type well known in the art. If desired rigid brackets can be substituted for the flexible brackets 14. The foregoing structure can be of varied construction and supported in any convenient manner as by resting on a supporting surface or the brackets may suspend from suitable spaced cables (as in a rope frame conveyor) or other supporting means. The brackets 14 support in laterally spaced inwardly tilted relationship to each other a pair of formed end brackets 16 and 18 which receive and rigidly secure in a manner hereinafter described the end portions respectively of a flexible member 19 such as wire cable or the like suspend therebetween. Two formed adjustable intermediate brackets 20 and 22 are supported upon the flexible member 19 at points respectively approximately one third and two thirds of the length of the cable from the bracket 16 to the bracket 18. The intermediate brackets 20 and 22 receive and secure, in a manner hereinafter to be described, the end portions of an elongated cylindrical shaft 28 coaxial with an elongated cylindrical steel roller 30, of a type well known in the art. Such roller 30 being rotatably mounted on the shaft 28 by means of suitable anti-friction bearings (not shown), is rotatable about a horizontal axis to the left of the flexible member 19 as seen in FIG. 2. In like manner the end bracket 18 and the intermediate bracket 22 secure and support a similar elongated cylindrical shaft 32 which in turn rotatably supports by means of suitable anti-friction bearings (not shown) an elongated hollow cylindrical steel roller 34, of a type well known in the art. The roller 34 is rotatable about an axis inclined at an angle to the horizontal in a vertical plane to the right of the flexible member 19 as seen in FIG. 2, being upwardly inclined from the intermediate bracket 22 to the end bracket 18. In a similar manner a steel roller 36 is rotatably supported by the intermediate bracket 20 and the end bracket 16 on an axis in the same vertical plane as that of the roller 34 and inclined upwardly in the opposite direction at substantially the same angle with the horizontal. The end brackets 16 and 18 and the intermediate brackets 20 and 22 being right hand and left hand pairs only one of each will be described; namely the end bracket 18 shown in FIGS. 6 and 7 and the intermediate bracket 20 shown in FIGS. 3, 4 and 5. The end bracket 18 as shown in FIG. 6 has a generally L-shaped cross section having a thin leg portion 40 normal to a relatively thick leg portion 42. Extending through the thick leg portion 42 on an axis normal to the rearward surface 38 is a bore 44 having a diameter substantially equal to that of the flexible member 19. The thick leg portion 42 has a formed rectangular recess 46 therein with a horizontal flat bottom surface 48 coplanar with the axis of the bore 44 so that the bore 44 in traversing the recess 46 forms a semi-cylindrical concave surface 50. A pair of laterally spaced bores 52 extend through the thick leg portion 42, having axes normal to the surface 48 and equally laterally spaced on either side of the axis of bore 44. The bores 52 slidably receive a clamping means 24 such as a U-bolt or the like having threaded end portions provided with suitable retaining means such as nuts 26 to secure the flexible element 19 in rigid engagement with the end bracket 18. The thick leg portion 42 of the bracket 18 is also provided with a notch 54 rectangular in cross section, having an arcuate intermediate portion to suitably receive the fixed projections of a conventional bracket 14 to suitably support the end bracket 18 as hereinbefore mentioned. The relatively thin leg portion 40 of the bracket 18 has a tapered opening 56 therethrough having an axis parallel to the axis of the bore 44. The opening 56 has its larger diameter adjacent to the rear surface 38 (see FIG. 6). The purpose of this opening 56 is to receive and retain, in angularly variable relationship with surface 38, an end of the cylindrical shaft 32 provided with a suitable retaining means 33 in a suitable peripheral notch (not shown) adjacent the end of shaft 32.

Referring to FIGS. 3, 4 and 5 there is shown the intermediate bracket 20 comprising two identically formed L-shaped elements 60 pivotably mounted on a cylindrical hinge pin 62 which is provided with suitable axially spaced flat washers 64 rigidly secured to the opposite ends of the hinge pin 62 to maintain abutting engagement of portions of the elements 60 therebetween. Each of the elements 60 has a relatively thin arcuate leg portion 66 and a relatively thick rectangular leg portion 68 normal to each other. The leg portion 68 has a flat rearward surface 70 and a flat forward surface 71 normal to the thin leg portion 66 and is provided with a formed opening 72 therethrough having an axis normal to the rearward surface 70. The opening 72 has a cylindrical bore portion 73' beginning at the forward surface 71 and extending substantially halfway through the thick leg portion 68. The remainder of the opening 72 is a formed opening 72' having opposite, quarter cylindrical surfaces coaxial with the bore portion 73' with flat surfaces extending therebetween (see FIG. 3). This difference in the shape of bore portion 73' and opening 72' provides shoulders 73 within the opening 72. The openings 72 in the elements 60 non-pivotably secure flattened end portions of the roller shafts 28 and 32, respectively, these shafts being suitably retained therewithin by suitable retaining means such as a snap ring 33 in a suitable peripheral groove (not shown) adjacent the ends of the respective shafts.

Each arcuate thin portion 66, of the elements 60 has a chordally flattened peripheral edge 69 coplanar with one surface of the thick leg portions 68 (see FIG. 5). The arcuate outline of the thin leg portion 66 is coaxial with a suitable bore through the thin leg portion 66 which pivotably receives the pin 62. The axis of the pin 62 is normal to two parallel flat surfaces 74 and 76, respectively of the thin leg portion 66, the flat surfaces 74 of the two elements 60 form abutting surfaces to maintain the parallel alignment of the thin leg portions 66 of the two elements 60 when the intermediate bracket 20 is assembled. Each flat surface 74 is provided with an arcuate notch 78, having a quarter circular cross section, along the curved edge thereof, the notches 78 of the two elements 60 forming a semi-circular cross sectioned arcuate notch having a cross sectional diameter substantially equal to that of the flexible member 19 which is suitably slidably received therein. An extended hook portion 80 of the thin leg portion 66 is coaxial with, but of greater radius than, the arcuate surface of the thin leg portion 66 and forms with the arcuate notch 78 a nearly semi-cylindrical notch portion 82 (see FIG. 4) the hook portion 80 is circumferentially placed so that the two hook portions 80 of the two elements 60 will be mated and in such position form a nearly complete cylindrical clamping portion composed of the two semi-cylindrical notches 82, to slidably receive the flexible member 19, when the two elements 60 are assembled.

The end portions of the shafts 28 and 32 are provided with suitable axial bores (not shown) suitably threaded to threadedly receive and retain lubrication fittings 84. The shafts 28 and 32 are also provided with suitably radial bores intersecting the axial bores so that lubricant introduced through the lubrication fittings 84 will be suitably applied to the anti-friction bearings (not shown) in the rollers 30, 34 and 36 in a manner well known in the art.

In operation the three rollers 34, 30 and 36 are supported by tension forces in the flexible element 19 in a desirable angular relationship to each other. Variations in this relative angle may be accomplished by shortening or lengthening the flexible member 19 through adjustment of its position in the clamping means 24. A downward force such as the weight of a conveyor belt and material being transported thereon will be supported by tension in the flexible member 19 cooperating with laterally spaced brackets 14. At all times the inward horizontal component of the tension in the flexible member 19 will be counterbalanced by outward horizontal forces applied through the brackets 14. The shoulders 73 provide longitudinal locating means for the shafts 28 and 32 with the rotatably attached rollers 30, 34, 36. The tapered bores 56 provide a variable angular relationship of the axes of the end rollers 34 and 36 to the end brackets 16 and 18 thus eliminating any need for flexibility in the brackets 14. It is to be noted that the idler assembly of this invention is sufficiently flexible to provide variable troughing for an overlying conveyor belt.

Because of the lateral separation of the axes of the end rollers 34 and 36 from the axis of the intermediate roller 30, the rollers 34 and 36 can longitudinally overlap the roller 30 thus providing transversely continuous support for an overlying belt without the gaps between rollers normally present in multiple in-line roller suspension type idler assemblies. The above described lateral separation of the rollers also makes it possible to lubricate these rollers much more easily than is possible without such lateral separation.

It is also to be noted that the device of this invention provides an adjustable three roller troughing idler assembly of light weight and small outline as compared to such devices of the prior art, requiring no special supporting structure or extra spacing between the load carrying and return runs of the conveyor belt.

Having described a preferred embodiment of this invention in accordance with the patent statutes, it is to be realized that modifications thereof may be made without departing from the broad spirit and scope of the invention. Accordingly, it is respectfully requested that this invention be interpreted as broadly as possible and be limited only by the prior art.

What is claimed is:

1. A variable troughing conveyor device comprising;

an elongated flexible element flexible throughout the length therof in all lateral directions; first, second and third idlers; means mounting said first and second idlers on said flexible element in longitudinally spaced relationship to each other laterally of and on one side of said flexible element; and means mounting said third idler laterally of and on the opposite side of said flexible element.

2. A variable troughing conveyor comprising, an elongated flexible element flexible throughout the length thereof in all directions; first, second and third idlers; means mounting said first and second idlers on said flexible element in longitudinally spaced relationship to each other laterally of and on one side of said flexible element; means mounting said third idler laterally of and on the opposite side of said flexible element in longitudinal overlapping relationship with said first and second idlers; and said first and second idlers being pivotably mounted relative to said third idler.

3. A support for a troughing idler assembly comprising, an elongated flexible member, flexible throughout the length thereof in all lateral directions, first bracket members secured to longitudinally spaced portions of said flexible member, respectively, second bracket members secured to longitudinally spaced portions of said flexible member respectively intermediate said first bracket members, said second bracket members having portions extending laterally outwardly from said flexible member in generally opposite directions, respectively, said first bracket members having portions extending laterally from said flexible member in one of said opposite directions, respectively, and longitudinally adjacent ones of said laterally extending portions of said first and second bracket members having means to support rotatable roller means therebetween, respectively.

4. A support as defined in claim 3 in which said portions of said second bracket members extending in opposite directions are rotatable with respect to each other about an axis extending transversely of said flexible member.

5. A support as defined in claim 3 in which said first bracket members are provided with means cooperable with stationary support means.

6. A troughing idler assembly comprising, an elongated flexible member flexible throughout the length thereof in all lateral directions, first bracket members secured to longitudinally spaced portions of said flexible member, respectively, second bracket members secured to longitudinally spaced portions of said flexible member respectively intermediate said first bracket members, each of said second bracket members having portions extending laterally outwardly from said flexible member in generally opposite directions, said first bracket members having portions extending laterally from said flexible member in one of said opposite directions, respectively, a roller means supported between the portions of said second bracket members extending in the direction other than said one direction, and other roller means supported between adjacent pairs of said portions of said first and second bracket members extending in said one direction, respectively.

7. A troughing idler assembly comprising, an elongated flexible member flexible throughout the length thereof in all lateral directions, first bracket members secured to longitudinally spaced portions of said flexible member, respectively, second bracket members secured to longitudinally spaced portions of said flexible member respectively intermediate said first bracket members, each of said second bracket members having portions extending laterally outwardly from said flexible member in generally opposite directions, said first bracket members having portions extending laterally from said flexible member in one of said opposite directions, respectively, a roller means supported between the portions of said second bracket members extending in the directions other than said one direction, other roller means supported between adjacent pairs of said portions of said first and second bracket members extending in said one direction, respectively, a stationary support having spaced portions, and said first bracket members having means cooperable with said spaced portions of said stationary support respectively whereby said flexible member is supported therebetween.

8. A conveyor device comprising: first, second and third idler; an elongated flexible element flexible throughout the length thereof in all lateral directions; a first pair of brackets secured to the opposite end portions respectively of said flexible element; said first pair of brackets having first means extending laterally therefrom and mounting the one ends of said first and second idlers respectively; a second pair of brackets supported in longitudinally spaced relationship on the intermediate portion of said flexible element; said second pair of brackets having second means respectively extending laterally therefrom in longitudinal alignment with said first means; said second means mounting the other ends of said first and second idlers respectively; said second pair of brackets having third means respectively extending laterally therefrom in a direction opposite of said first and second means; said third means being longitudinally aligned with each other and spaced a greater distance apart than the spacing between said second means; and said third means mounting the opposite ends respectively of said third idler.

9. A conveyor device comprising: first, second and third idlers; an elongated flexible element flexible throughout the length thereof in all lateral directions; a pair of brackets secured to the opposite end portions respectively of said flexible element; said first pair of brackets having first means extending laterally therefrom mounting the one ends of said first and second idlers respectively; a second pair of brackets supported in longitudinally spaced relationship on the intermediate portion of said flexible element; said second pair of brackets having second means respectively extending laterally therefrom in longitudinal alignment with said first means; said second means mounting the other ends of said first and second idlers respectively; said second pair of brackets having third means respectively extending laterally therefrom in a direction opposite of said first and second means; said third means being longitudinally aligned with each other and spaced a greater distance apart than spacing between said second means; said third means mounting the opposite ends respectively of said third idler; and said second means being pivotable relative to said third means respectively.

10. A bracket for a conveyor device comprising; a pair of generally L-shaped members having leg portions respectively, one of said leg portions of each of said pair of L-shaped members having a raised surface extending normal thereto and in a direction opposite from the other leg portion thereof, said one of said leg portions having a first bore extending therethrough normal to said raised surface, another of said leg portions of each of said pair of L-shaped members having a second bore extending laterally therethrough, said leg portions having said raised surfaces respectively in abutting relationship and having an elongated shaft extending through said first bores permitting said leg portions to be rotated thereon relative to each other, means secured to said shaft for captively securing said raised surfaces of said leg portions respectively in abutting relationship, and means integral with each of said one leg portions extending normal thereto in the same direction as said raised surface and radially spaced therefrom.

11. A bracket for a conveyor device comprising, a generally L-shaped member having leg portions with one coextensive side surface, one of said leg portions having a tapered bore extending normal thereto, another of said leg portions having another bore extending therethrough the longitudinal axis of which bore lies in a plane parallel to a plane containing the longitudinal axis of said tapered bore, said another leg portion having a recess therein normal to and communicating with a longitudinal portion of said another bore, said another leg portion having a pair of parallel bores laterally spaced on either side of said another bore and extending normal to the bottom surface of said recess, and means located on said another leg portion for mounting said brackets on a cooperating support.

References Cited by the Examiner

UNITED STATES PATENTS

| | | | |
|---|---|---|---|
| 1,516,666 | 11/24 | Briggs | 198—192 |
| 2,592,915 | 4/52 | Lee | 198—192 |
| 2,896,774 | 7/59 | Long et al. | 198—202 |
| 2,948,384 | 8/60 | Pate. | |
| 3,070,220 | 12/62 | Risse | 198—192 |
| 3,075,631 | 1/63 | Arndt et al. | 198—192 |

FOREIGN PATENTS 111,443    8/44    Sweden.

SAMUEL F. COLEMAN, *Primary Examiner.*

WILLIAM B. La BORDE, *Examiner.*